J. L. STUBBLEFIELD.
LOCKING DEVICE.
APPLICATION FILED NOV. 6, 1918.
1,307,161.
Patented June 17, 1919.
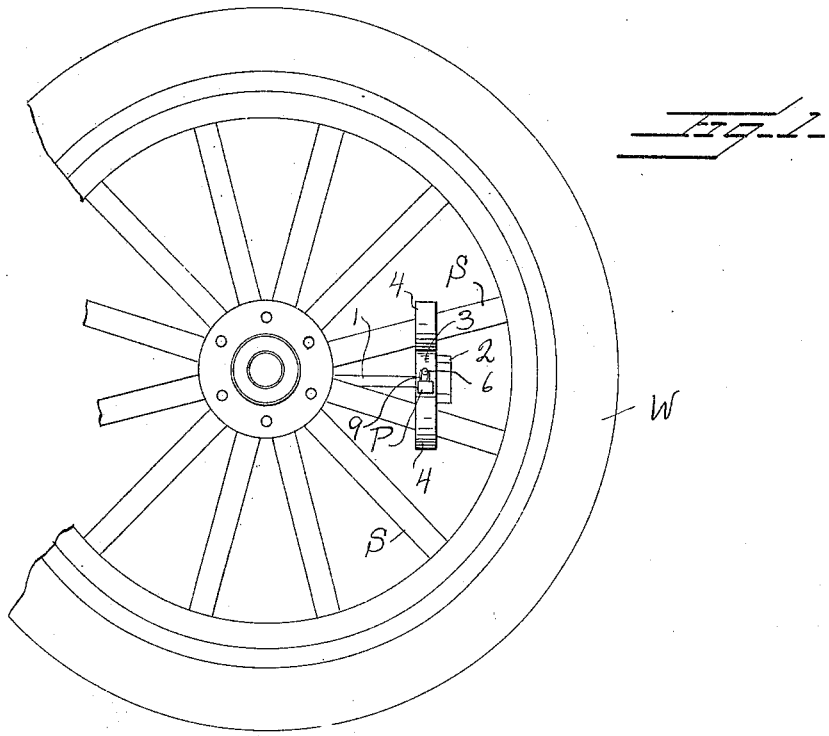
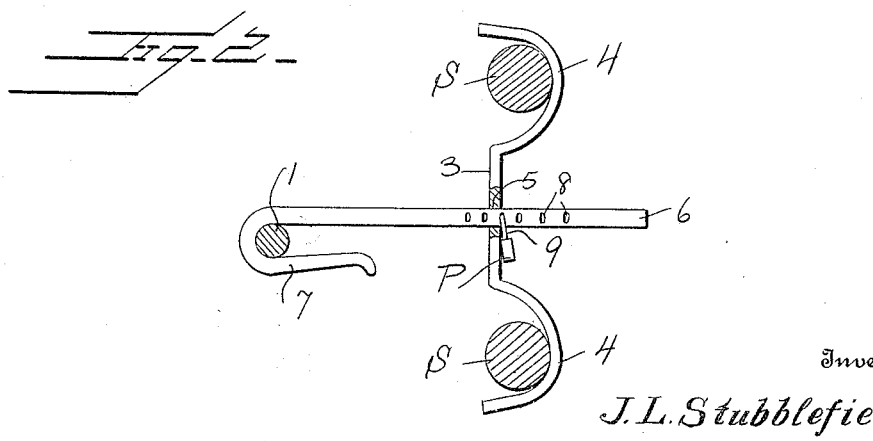
Inventor
J. L. Stubblefield
By Watson E. Coleman
Attorney

UNITED STATES PATENT OFFICE.

JAMES LEVI STUBBLEFIELD, OF ANGIOLA, CALIFORNIA, ASSIGNOR OF ONE-HALF TO ARCHIE T. PARKER, OF STOCKTON, CALIFORNIA.

LOCKING DEVICE.

1,307,161. Specification of Letters Patent. Patented June 17, 1919.

Application filed November 6, 1918. Serial No. 261,343.

*To all whom it may concern:*

Be it known that I, JAMES LEVI STUBBLEFIELD, a citizen of the United States, residing at Angiola, in the county of Tulare and State of California, have invented certain new and useful Improvements in Locking Devices, of which the following is a specification, reference being had to the accompanying drawings.

This invention relates to certain improvements in locking devices, and has relation more particularly to a device of this general character especially designed and adapted for use with automobiles or other vehicles, and it is an object of the invention to provide a novel and improved device of this general character which coacts with the wheel of a vehicle for holding the same against rotation, and whereby the vehicle is protected against use by an unauthorized person.

It is also an object of the invention to provide a device of this general character having novel and improved means coacting with a part of the vehicle for holding the wheel against rotation.

The invention consists in the details of construction and in the combination and arrangement of the several parts of my improved locking device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in elevation illustrating a locking device constructed in accordance with an embodiment of my invention, and in applied position; and Fig. 2 is an enlarged view partly in section and partly in rear elevation of my improved locking device and the parts of the vehicle coacting therewith.

As disclosed in the accompanying drawings, W denotes a steering wheel of a vehicle, and 1 denotes a spindle arm of a well known type and with which a steering rod 2 coacts in a conventional manner.

My improved locking device comprises an elongated member 3 formed preferably of metal, and which is provided at its opposite end portions with the hook members 4 which are adapted to be engaged with adjacent spokes S of the wheel W.

Substantially midway its length the member 3 is provided with an opening 5 through which is directed the elongated member or rod 6. One end portion of the rod 6 is provided with an inwardly facing hook 7 which is adapted to receive the spindle 1 or the like. The opposite end portion of the member or rod 6 is provided with a series of longitudinally spaced openings 8 and through which is adapted to be directed the shackle 9 of a padlock or the like.

With the hook 7 of the rod 6 snugly engaged with the spindle 1 and the shackle 9 of the padlock P disposed through an opening 8 in close proximity to the member 3, the wheel is effectually locked against rotation, and the vehicle substantally protected against use by an unauthorized person.

When it is desirous to release the wheel W it is only necessary to unlock the padlock P and to remove the same from engagement with the rod 6, whereupon the requisite separating movements between the rod 6 and the member 3 may be had in order to disengage the hook 7 from the spindle arm 1 and the member 3 from the spokes S. The manner of applying my improved lock is believed to be obvious to those skilled in the art to which my invention appertains.

From the foregoing description, it is thought to be obvious that a locking device constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

What is claimed is:

A locking device for automobiles comprising a member having its opposite end portions provided with hooks, said hooks being adapted for engagement with adjacent spokes of a wheel, a rod loosely disposed through the member at a point between the hooks, one end portion of the rod being provided with an inwardly facing hook adapted to receive a spindle arm, and a holding member detachably engaged with the rod and coacting with the first named member.

In testimony whereof I hereunto affix my signature in the presence of two witnesses.

JAMES LEVI STUBBLEFIELD.

Witnesses:
H. CARL MOHINKE,
NIM EVANS.

Copies of this patent may be obtained for five cents each, by addressing the "Commissioner of Patents, Washington, D. C."